United States Patent Office 3,766,101
Patented Oct. 16, 1973

3,766,101
PROCESS FOR THE POLYMERIZATION OF ALKYLENE OXIDE AND CATALYST THEREFOR
Hisataka Komai, Kamakura, Tatuo Usui and Hirosi Hosozawa, Yokohama, Nubuhiro Kimura, Itami, and Hiroshi Yamamoto and Tetsuya Nakata, Ibaraki, Japan, assignors to The Japanese Geon Company, Ltd., Tokyo, and Osaka Soda Co., Ltd., Osaka, Japan
No Drawing. Filed June 8, 1971, Ser. No. 151,136
Claims priority, application Japan, June 9, 1970, 45/49,177
Int. Cl. C08g 23/14
U.S. Cl. 260—2 A                       1 Claim

ABSTRACT OF THE DISCLOSURE

A process for the preparation of homopolymer or copolymer of an alkylene oxide by polymerizing at least one alkylene oxide in the presence of catalyst, the catalyst comprising the composition formed by mixing the reaction product (component 1) obtained by reacting at least one compound selected from the group consisting of an organotin compound containing at least one Sn-C linkage in its molecule, and halides of titanium, zirconium, hafnium, or tin, with a phosphoric acid ester in which the organic radical contains 1–12 carbon atoms; with a compound (component 2) selected from the group consisting of alkylation products of zinc, magnesium, aluminum, titanium, silicon or tin, alkoxides of zinc, magnesium, aluminum, titanium, silicon or tin, or halides of titanium, zirconium or tin.

---

This invention relates to a process for the polymerization of an alkylene oxide and catalyst therefor.

The product obtained by reacting a compound selected from the group consisting of an organotin compound containing at least one Sn-C linkage in its molecule and halides of titanium, zirconium, hafnium, or tin, with a phosphoric acid ester in which the organic radical contains 1 to 12 carbons, is known as a catalyst for the polymerization of alkylene oxides. This catalyst has a number of advantages such as excellent catalytic activities at relatively low temperatures, high stability and consequently, easy handling, as well as minor quantity of use required for achieving equivalent results to those with larger quantities of other known catalysts, enabling the omission of the catalyst-removing step after the polymerization.

The main object of the present invention is to provide a process for the preparation of alkylene oxide homopolymers and copolymers of a higher degree of polymerization at higher yields, which is achieved by improving the above known catalyst.

Other objects of the invention will become apparent from the following description.

It has been discovered that the above objects of the invention can be accomplished by using the composition formed by mixing the above-specified known catalyst with, as an additional component, a compound selected from the group consisting of alkylation products of zinc, magnesium, aluminum, titanium, silicon or tin, alkoxides of zinc, magnesium, aluminum, titanium, silicon or tin, and halides of titanium, zirconium, or tin, as the catalyst for polymerization of an alkylene oxide.

According to the invention the novel catalyst composition which is characterized in that it is formed by mixing the reaction product (component 1) obtained by reacting at least one compound selected from the group consisting of an organotin compound containing at least one Sn-C linkage in its molecule, and halides of titanium, zirconium, hafnium, or tin, with a phosphoric acid ester in which the organic radical contains 1–12 carbons; with a compound selected from the group consisting of alkylation products of zinc, magnesium, aluminum, titanium, silicon, or tin; alkoxides of zinc, magnesium, aluminum, titanium, silicon, or tin; and halides of titanium, zirconium, or tin (component 2) is provided. Furthermore, the invention also provides a novel process for the preparation of homopolymer or copolymer of an alkylene oxide, which comprises polymerizing at least one alkylene oxide in the presence of above novel catalyst composition.

As the organotin compound containing at least one Sn-C linkage in its molecule, which is used for the preparation of component 1, the following may be named as specific examples: alkyl or aryl tin compounds such as tetraethyltin, tetrabutyltin, tetraphenyltin, allyl, trimethyltin, triethyl-phenyltin, diamyl-dibutyltin, benzylbutyl-diphenyltin, tetraethyldistannoxane, etc.; alkyl or aryl tin halides such as tributyltin chloride, triethyltin fluoride, allyldibutyltin bromide, dibutyltin dichloride, bis(bromomethyl)tin dibromide, methyltin trichloride, diphenyltin dichloride, etc.; alkyl or aryltin oxides such as bis-triethyltin oxide, dibutyltin oxide, dioctyltin oxide, bis-tributyltin oxide, diphenyltin oxide, etc.; alkyltin hydroxides such as trimethyltin hydroxide, benzylbutylphenyltin hydroxide, etc.; alkyltin sulfides such as bistriethyltin sulfide; alkylalkoxy tin compounds such as dibutoxy-dibutyltin; organotin-carboxylic acid derivatives such as dibutyltin laurate, dibutyltin dimaleate, etc.; organostannic acid compounds such as benzenestannic acid; organotin hydrides such as butyltin trihydride; and other organotin compounds such as bis-diphenyltin pyrophosphate, dibutyltin disodium, etc.

As the halides of titanium, zirconium, hafnium, and tin which are used in place of, or concurrently with, the above organotin compound, for the preparation of component 1, fluorides, chlorides, bromides, and iodides of the named metals can be employed.

Also as the phosphoric acid ester which the organic radical contains 1 to 12 carbon atoms, to be reacted with the above organotin compound and/or the named metal halide for the preparation of component 1, the following groups of compounds can be used:

$(CH_3)_3PO_4$, $(C_2H_5)_3PO_4$, $(C_3H_7)_3PO_4$, $(C_4H_9)_3PO_4$,
  $(C_5H_{11})_3PO_4$, $(C_6H_{13})_3PO_4$, $(C_7H_{15})_3PO_4$,
$(C_8H_{17})_3PO_4$, $(CH_2=CHCH_2)_3PO_4$, $(C_6H_5CH_2)_3PO_4$,
  $(C_6H_5)_3PO_4$, $(CH_3C_6H_4)_3PO_4$, $(ClC_2H_4)_3PO_4$,
  $(C_6H_{11})_3PO_4$, $(CH_3)_2HPO_4$, $(C_2H_5)_2HPO_4$,
  $(C_3H_7)_2HPO_4$, $(C_4H_9)_3HPO_4$, $(C_5H_{11})_2HPO_4$,
  $(C_6H_{13})_2HPO_4$, $(C_7H_{15})_2HPO_4$, $(C_8H_{17})_3HPO_4$,
$(CH_3C_6H_4)_2HPO_4$, $(C_6H_5)_2HPO_4$, $(C_6H_5CH_2)_2HPO_4$,
  $(ClC_2H_4)_2HPO_4$, $(CH_2=CHCH_2)_2HPO_4$,
  $(CH_3)_2(CH_3CO)PO_4$, $(C_2H_5)_2(CH_3CO)PO_4$,
  $(C_3H_7)_2(CH_3CO)PO_4$, $(C_4H_9)_2$, $(CH_3CO)PO_4$,
  $(C_5H_{11})_2(CH_3CO)PO_4$, $(C_6H_{13})_2(CH_3CO)PO_4$,
  $(C_7H_{15})_2(CH_3CO)PO_4$, $(C_8H_{17})_2(CH_3CO)PO_4$,
    $(CH_2=CHCH_2)_2(CH_3CO)PO_4$,
  $(C_6H_5CH_2)_2(CH_3CO)PO_4$, $(C_6H_5)_2(CH_3CO)PO_4$,
$(CH_3)_4P_2O_7$, $(C_2H_5)_4P_2O_7$, $(C_3H_7)_4P_2O_7$, $(C_4H_9)_4P_2O_7$,
  $(C_5H_{11})_4P_2O_7$, $(C_6H_{12})_4P_2O_7$, $(C_7H_{15})_4P_2O_7$,
$(C_8H_{15})_4P_2O_7$, $(CH_3)_3PO_3$, $(C_2H_5)_3PO_3$, $(C_3H_7)_3PO_3$,
  $(C_4H_9)_3PO_3$, $C_6H_5(CH_3O)_2PO$, $C_6H_5(C_2H_5O)_2PO$,
$C_6H_5(C_3H_7O)_2PO$, $C_6H_5(C_4H_9O)_2PO$, $C_6H_5(C_6H_5O)_2PO$,
  $Cl(CH_3O)_2PO$, $Cl(C_2H_5O)_2PO$, $Cl(C_3H_7O)_2PO$,
  $Cl(C_4H_9O)_2PO$, $Cl(C_5H_{11}O)_2PO$, $Cl(C_6H_{13}O)_2PO$,
  $Cl(C_7H_{15}O)_2PO$, $Cl(C_8H_{17}O)_2PO$, $Cl(C_6H_5O)_2PO$,
    $Cl(CH_3C_6H_4O)_2PO$, $(C_2H_5O)_3P$, $(C_3H_7O)_3P$,
                $(C_4H_9O)_3P$, etc. Obviously it is also permissible to replace those phosphoric acid esters with the starting materials, thereof, for example, phosphorus oxyhalide such as phosphorus oxychloride ($POCl_3$) and alcohol.

The metal alkylates, metal alkoxides and metal halides to be used as component 2 in accordance with the present invention include, for example, dialkylzinc compounds such as dimethylzinc, diethylzinc, and dibutylzinc; dialkylmagnesium compounds such as dimethylmagnesium, diethylmagnesium and dipropylmagnesium; trialkylaluminum compounds such as triethylaluminum and triisobutylaluminum; alkylaluminum hydrides such as diisobutylaluminum hydride; alkylaluminum halides such as diethylaluminum chloride and ethylaluminum dichloride; tetraalkyltin compounds such as tetraethyltin; alkyltin halides such as dibutyltin chloride; aluminum alkoxides such as aluminum triisopropoxide; titanium alkoxides such as titanium tetrabutoxide; silicon alkoxides such as silicon tetraethoxide; titanium halides such as titanium tetrachloride; zirconium halides such as zirconium tetrachloride; and tin halides such as tin tetrachloride, etc.

The catalyst composition of the invention is formed by first reacting the organotin compound and/or the metal halide with the phosphoric acid ester (or mixture of phosphorus oxyhalide with alcohol) under heating, and thereafter adding to te reaction product as component 1, the metal alkylate and/or metal alkoxide and/or metal halide as component 2. In that procedure, the same compound used as component 1 may be selected as component 2. For instance, to component 1 obtained by reacting titanium tetrachloride with phosphoric acid ester, titanium tetrachloride may be added as component 2. The catalyst composition obtained exhibits markedly improved catalytic activity compared with the catalyst obtained by reacting a phosphoric acid ester with excessive titanium tetrachloride. This fact persuasively demonstrates the importance of component 2 for the catalyst composition of subject invention.

In the reaction of specified organotin compound and/or the metal halide with the phosphoric acid ester, the amount of the latter may be within the range of 0.02 to 50 moles per moles of the organotin compound and/or metal halide, but the most normally employed range is from 0.1 to 10 moles. The reaction can be performed by heating the reactants at 100–400° C. preferably 150–300° C. To obtain a catalyst of still higher activity. The reaction progresses equally smoothly in air, inert gas, solvent or water, while it is performed in an inert gas such as nitrogen with particular preference. This is particularly true when either of the reactants is apt to be oxidized, or possesses polymerizable functional groups. The reaction product can be used as the component 1 of the subject catalyst without any further processing, but preferably it is refined by such procedures as heating under reduced pressure to remove volatile substances such as unreacted phosphoric acid ester and side products, and furthermore, washing with, or recrystallization from, a suitable solvent, and pulverized before use.

The metal alkylate, metal alkoxide, or metal halide mixed with the above component 1 as the component 2, is used in an amount ranging from 0.001–100 parts by weight, preferably 0.01–10 parts by weight, per 1 part by weight of component 1.

If components 1 and 2 are mixed and contacted in advance of the polymerization, reaction may take place under certain conditions, and the intended catalytic activity may be lost. Therefore it is desirable that the two are added separately under polymerizing conditions, or mixed in the presence of the monomer or monomers to be polymerized, or first component 1 alone is used to initiate the polymerization, and thereafter component 2 is added to the polymerization system.

Examples of alkylene oxide which can be homo or copolymerized in the presence of the catalyst composition formed by mixing components 1 and 2 in accordance with the invention include alkylene oxides such as ethylene oxide, propylene oxide, butylene oxide, isobutylene oxide, and butadiene monoxide; substituted alkylene oxides such as epichlorohydrin, epibromohydrin, methacrylchloride epoxide, trifluoromethylethylene oxide, and dichloroisobutylene oxide; alicyclic epoxides such as cyclohexene oxide and vinylcyclohexene oxide; glycidyl ethers such as allyl glycidyl ether, phenyl glycidyl ether, and chloroethyl glycidyl ether; and other epoxides such as glycidyl acrylate, styrene oxide and epoxystearate.

The catalyst composition of the invention is used for the polymerization of the alkylene oxide at such ratios that both components 1 and 2 range from 0.01–10 parts by weight per 100 parts by weight of the monomer. The polymerization is performed in the presence of specified amount of the catalyst composition, optionally in solvent, at temperatures ranging from −20 to 200° C., preferably from 0 to 100° C. As the useful solvent, for example ethers such as diethyl ether, dipropyl ether, and diisopropyl ether; aromatic hydrocarbons such as benzene and toluene; saturated aliphatic hydrocarbons and alicyclic hydrocarbons such as n-heptane and cyclohexane; halogenated hydrocarbons such as chlorobenzene; and haloalkanes such as methyl chloride, methylene chloride, chloroform, carbon tetrachloride, and ethylene dichloride; etc., may be named.

Hereinafter the subject invention will be more specifically explained with reference to the working examples.

In the examples, the molecular weight of the alkylene oxide polymer or copolymer formed is expressed by reduced specific viscosity which means the $\eta_{sp./c.}$ determined with regard to the solution of the polymer or copolymer in a diluent. As to the polymers of ethylene oxide and propylene oxide, 0.2 g. of the sample polymer was dissolved in 100 ml. of benzene, and the reduced specific viscosity was measured at 30° C. As to epichlorohydric homopolymers and copolymers containing epichlorohydrin, the sample polymer or copolymer was dissolved in cyclohexanone containing 0.5% of antioxidant, 2,2′-methylene-bis(4-methyl-6-tertiary butylphenol) to form a 0.1% solution thereof, which was made the perfect solution by being subsequently heated to 100° C., and cooled to 50° C., the measurement being performed at the last-mentioned temperature.

EXAMPLE 1

Twenty-two (22) g. of dibutyltin dichloride and 53 g. of tributyl phosphate were mixed in a 500-ml. capacity glass vessel, and heated to remove the volatile matter by distillation. Violent reaction started to take place from approximately 230° C., and large quantities of volatile matter were generated. The heating was further continued, and the temperature of 260° C. was maintained for 10 minutes. The system was then cooled off to 150° C., and dried under reduced pressure for 2 hours. The solid reaction product obtained (component 1), together with triisobutylaluminum (component 2), was used as the catalyst for the polymerization of epichlorohydrin.

The air in a 100-ml. capacity glass ampule was replaced by nitrogen, and into the ampule 25 g. of epichlorohydrin, 25 g. of benzene, and triisobutylaluminum (component 2) of the amount specified in Table 1 were charged. Then 0.050 g. of the above solid reaction product (component 1) was added to the system, to initiate the polymerization. After 10 hours polymerization at 30° C., the product was poured into n-hexane to remove unreacted monomer and the solvent. The remaining product was further vacuum-dried for 24 hours at 50° C. to provide a white solid. The yield and reduced specific viscosity of the polymer obtained of each run are shown in Table 1. For comparison the results of omission of triisobutylaluminum (Run No. 1) and of using triisobutylaluminum alone (Run No. 6) are given concurrently.

The water content of the benzene and epichlorohydrin used for the polymerization, as determined by Karl Fischer's method was 12 p.p.m.

TABLE 1

| Run No. | Triisobutylaluminum (g.) | Yield (percent) | $\eta_{sp}/c$ |
|---|---|---|---|
| 1 (control) | 0 | 4.0 | 0.72 |
| 2 | 0.005 | 7.2 | 0.85 |
| 3 | 0.010 | 9.0 | 0.92 |
| 4 | 0.050 | 16.0 | 0.89 |
| 5 | 0.10 | 19.5 | 0.93 |
| 6 (control)[1] | 0.050 | Trace | |

[1] Polymerization by the action of triisobutylaluminum alone.

EXAMPLE 2

Epichlorohydrin and ethylene oxide were copolymerized by the catalytic action of the solid product prepared similarly to Example 1 (component 1) and triisobutylaluminum (component 2).

Precisely 0.11 g. of the solid product (component 1) was weighed and placed in a 100-ml. capacity ampule, and the inside atmosphere of the ampule was substituted with nitrogen. Then 51.5 g. of epichlorohydrin, 5.5 g. of ethylene oxide, and triisobutylaluminum (component 2) in the amount specified in Table 2 were charged into the ampule, followed by 22 hours polymerization at 10° C. Thereafter the product was poured into n-hexane to remove the unreacted monomers, and vacuum-dried to provide a tough rubbery white solid. The yield and reduced specific viscosity of the polymer formed of each run were as given in Table 2. For comparison, the results of the run using no triisobutylaluminum (Run No. 1) are also shown in the same table.

TABLE 2

| Run No. | Triisobutylaluminum (g.) | Yield (percent) | $\eta_{sp}/c$ |
|---|---|---|---|
| 1 (control) | 0 | 4.9 | 27.5 |
| 2 | 0.03 | 14.2 | 4.13 |
| 3 | 0.06 | 13.5 | 3.38 |
| 4 | 0.11 | 10.8 | 2.91 |
| 5 | 0.23 | 9.9 | 3.01 |

EXAMPLE 3

Seventy (70) g. of tributyltin chloride and 115 g. of tributyl phosphate were mixed in a 500-ml. capacity glass vessel, and heated under stirring, while distilling off the volatile matter. When the reaction temperature reached 265° C., that temperature was maintained for 10 minutes, and thereafter the system was cooled to 150° C. and vaccum-dried for 2 hours to produce 78 g. of a white solid.

Various alkylene oxides as specified in Table 3 were polymerized, using the white solid (component 1) obtained above and triisobutylaluminum (component 2) as the catalyst. The amount of triisobutylaluminum used and the polymerization conditions of each run are shown in Table 3, and the yield and reduced specific viscosity of the polymer are shown in Table 4.

For comparison, the results of the runs using no triisobutylaluminum (Run Nos. 1, 4, and 7) are also given in the same tables.

TABLE 4

| Run No. | Polymerization conditions | Yield (percent) | $\eta_{sp}/c$ |
|---|---|---|---|
| 1 (control) | 10° C., 22 hours | 2.1 | 1.53 |
| 2 | do | 8.3 | 2.69 |
| 3 | do | 69.8 | 5.77 |
| 4 (control) | do | 23.0 | 2.23 |
| 5 | do | 38.0 | 3.47 |
| 6 | do | 58.0 | 3.67 |
| 7 (control) | 30° C., 22 hours | 23.6 | 0.08 |
| 8 | do | 49.0 | 0.09 |

EXAMPLE 4

Epichlorohydrin and ethylene oxide were copolymerized in the manner similar to Example 2, in the presence of the white solid (component 1) prepared similarly to Example 3 and the organoaluminum compound (component 2) varied for each run as specified in Table 5, as the catalyst. The polymerization conditions, yield and reduced specific viscosity of the product polymer in each run were as shown in Table 5. For comparison, results omitting the use of organoaluminum compound (Run No. 1) are also shown.

TABLE 5

Epichlorohydrin—51.5 g.
Ethylene oxide—5.5 g.
White solid (component 1)—0.11 g.
Polymerization conditions—10° C. for 22 hrs.

| Run No. | Organoaluminum compound (component 2) Type | Amount (g.) | Yield (percent) | $\eta_{sp}/c$ |
|---|---|---|---|---|
| 1 (control) | | 0 | 5.5 | 2.45 |
| 2 | Triethylaluminum | 3.7×10⁻³ | 9.6 | |
| 3 | do | 7.4×10⁻³ | 11.5 | 4.46 |
| 4 | do | 14.8×10⁻³ | 10.2 | 4.30 |
| 5 | Dibutylaluminum hydride | 5.0×10⁻² | 7.4 | 3.12 |
| 6 | do | 10.0×10⁻³ | 11.8 | |
| 7 | do | 20.0×10⁻³ | 15.3 | 3.66 |
| 8 | do | 40.0×10⁻³ | 13.8 | 3.65 |
| 9 | Diethylaluminum chloride | 4.8×10⁻³ | 6.0 | |
| 10 | do | 8.6×10⁻³ | 14.0 | 4.23 |
| 11 | do | 17.2×10⁻³ | 14.6 | |
| 12 | do | 34.4×10⁻³ | 10.4 | 4.02 |
| 13 | Aluminum triisopropoxide | 29.0×10⁻³ | 15.0 | |
| 14 | do | 58.0×10⁻³ | 14.7 | 3.85 |

EXAMPLE 5 (CONTROL)

Under the same polymerization conditions as given in Example 4, copolymerization was attempted in the presence of organoaluminum compound alone as specified in Table 6. As is clear from the results in the same table, the polymerization yield was only a trace in all runs, indicating that the organoaluminum compound alone is useless as the catalyst.

TABLE 6

| Run No. | Organoaluminum compound Type | Amount (g.) | Yield |
|---|---|---|---|
| 1 | Triethylaluminum | 14.8×10⁻³ | Trace. |
| 2 | Diethylaluminum hydride | 20.0×10⁻³ | Do. |
| 3 | Diethylaluminum chloride | 17.2×10⁻³ | Do. |
| 4 | Aluminum triisopropoxide | 29.0×10⁻² | Do. |

TABLE 3

| Run No. | Alkylene oxide Type | Amount (g.) | Benzene (g.) | White solid (component 1) (g.) | Triisobutylaluminum (component 2) (g.) |
|---|---|---|---|---|---|
| 1 (control) | Ethylene oxide | 2.5 | 47.5 | 0.025 | 0 |
| 2 | do | 2.5 | 47.5 | 0.025 | 2.3×10⁻³ |
| 3 | do | 2.5 | 47.5 | 0.025 | 4.5×10⁻³ |
| 4 (control) | Propylene oxide | 15 | 35 | 0.150 | 0 |
| 5 | do | 15 | 35 | 0.150 | 10.2×10⁻³ |
| 6 | do | 15 | 35 | 0.150 | 20.2×10⁻³ |
| 7 (control) | Allyl glycidylether | 15 | 35 | 0.150 | 0 |
| 8 | do | 15 | 35 | 0.150 | 10.2×10⁻³ |

EXAMPLE 6

12.4 grams of dibutyltin oxide and 43.4 g. of tributyl phosphate were mixed in a 500-ml. capacity glass vessel, and heated while the voltaile matter released was distilled off. When the reaction temperature reached 280° C., the heating at such temperature was continued for 10 minutes, and thereafter the system was cooled to 150° C., and vacuum-dried for 2 hours to provide a white solid.

Epichlorohydrin was polymerized in the smaller manner to Example 1, using the above-obtained white solid (component 1) and titanium tetrabutoxide (component 2) in the amount specified in Table 7 as the catalyst. The polymerization conditions, and yield and reduced specific viscosity of the polymer formed of each run were as shown in Table 7. For comparison, the results of the run using no titanium tetrabutoxide (Run No. 1) are also shown in the same table.

TABLE 7

Epichlorohydrin—25 g.
Benzene—25 g.
White solid (component 1)—0.15 g.
Polymerization conditions—30° C. for 20 hrs.

| Run No. | Titanium tetrabutoxide (component 2) (g.) | Yield (percent) | $\eta_{sp}/c$ |
|---|---|---|---|
| 1 (control) | 0 | 24.8 | 0.92 |
| 2 | 6.4×10⁻³ | 34.6 | 1.10 |
| 3 | 12.8×10⁻³ | 47.0 | 1.03 |
| 4 | 25.6×10⁻³ | 52.2 | 1.21 |

EXAMPLE 7

Tributyltin chloride, phosphorus oxychloride, and n-butanol at the molar ratios of 1:2:10 were reacted in carbon tetrachloride. After the reaction the system was heated, and the solvent, unreacted monomers and voltaile matter were distilled off. When the temperature reached 290° C., the system was further heated for an additional 5 minutes at such temperature, and thereafter cooled to 150° C. and vacuum-dried for 2 hours to provide a white solid.

Epichlorohydrin was polymerized in the similar erized in the manner similar to Example 2, using the above white solid (component 1) and the organometallic compound (component 2) specified in Table 8, as the catalyst. The polymerization conditions, and yield as well as reduced specific viscosity of the polymer formed of each run are given in Table 8. For comparison, the results of the run omitting the use of organometallic compound (Run No. 1) are also shown in the same table.

TABLE 8

Epichlorohydrin—51.5 g.
Ethylene oxide—5.5 g.
White solid (component 1)—0.11 g.
Polymerization conditions—10° C. for 22 hrs.

| Run No. | Organometallic compound (component 2) Type | Amount (g.) | Yield (percent) | $\eta_{sp}/c$ |
|---|---|---|---|---|
| 1 (control) | | 0 | 6.2 | 2.47 |
| 2 | Diethyl zinc | 4.4×10⁻³ | 7.8 | 2.90 |
| 3 | do | 8.8×10⁻³ | 13.3 | 4.13 |
| 4 | Diethyl magnesium | 4.0×10⁻³ | 9.3 | 3.12 |
| 5 | do | 8.0×10⁻³ | 14.6 | 3.92 |

EXAMPLE 8

Tin tetrachloride, phosphorus oxychloride, and n-butanol at the molar ratio of 1:1:5 were reacted in carbon tetrachloride. After the reaction the temperature of the system was gradually raised to cause removal by distillation of the solvent, unreacted monomers and volatile matter, to form a solid product. This solid product (componet 1) and triisobutylaluminum in the amount specified in Table 9 (component 2) were used as the catalyst for polymerization of epichlorohydrin in the manner similar to Example 1. The polymerization conditions, and the resulting polymer's yield and reduced specific viscosity in each run were as given in Table 9 below. For comparison, the results of the run using no triisobutylaluminum (Run No. 1) are also given.

TABLE 9

Epichlorohydrin—15 g.
Benzene—35 g.
Solid product (component 1)—0.75 g.
Polymerization conditions—30° C for 20 hrs.

| Run No. | Triisobutylaluminum (component 2) (g.) | Yield (percent) | $\eta_{sp}/c$ |
|---|---|---|---|
| 1 (control) | 0 | 33.7 | 0.95 |
| 2 | 0.08 | 57.7 | 1.15 |
| 3 | 0.30 | 78.5 | 1.23 |
| 4 | 0.75 | 82.9 | 1.40 |

EXAMPLE 9

Ten (10.0) g. of zirconium tetrachloride, 6.6 g. phosphorus oxychloride, and 31.9 g. of n-butanol were reacted in carbon tetrachloride, and thereafter the solvent, unreacted monomers, and volatile matter were distilled off from the system under heating. When the temperature reached 210° C., the system was cooled to provide 32.0 g. of a brown solid.

Epichlorohydrin was polymerized in the manner similar to Example 1, using this brown solid (component 1) and triisobutylaluminum (component 2) in the amount specified in Table 10 as the catalyst. The polymerization conditions, and the yield and reduced specific viscosity of the polymer produced of each run, were as given in Table 10. For comparison, the results of the polymerization in the absence of triisobutylaluminum (Run No. 1) are also shown.

TABLE 10

Epichlorohydrin—25 g.
Benzene—25 g.
Brown solid (component 1)—0.10 g.
Polymerization conditions—30° C. for 18 hrs.

| Run No. | Triisobutylaluminum (component 2) (g.) | Yield (percent) | $\eta_{sp}/c$ |
|---|---|---|---|
| 1 (control) | 0 | 20.3 | 1.03 |
| 2 | 0.05 | 41.5 | 1.25 |
| 3 | 0.10 | 59.2 | 1.30 |
| 4 | 0.20 | 71.9 | 1.28 |

EXAMPLE 10

Ten (10) g. of zirconium tetrachloride and 11.4 g. of tributyl phosphate were reacted in carbon tetrachloride, and then the solvent and volatile matter were distilled off from the system under heating. When the temperature finally reached 200° C., the system was cooled to provide 14.3 g. of a brown solid.

Epichlorohydrin was polymerized in the manner similar to Example 1, using this brown solid (component 1) and titanium tetrabutoxide (component 2) in the amount specified in Table 11 below, as the catalyst. The polymerization conditions, and the yield and reduced specific viscosity of the polymer produced of each run were as given in Table 11. For comparison, the results of the run using no titanium tetrabutoxide (Run No. 1) are also given in the same table.

TABLE 11

Epichlorohydrin—25 g.
Benzene—25 g.
Brown solid (component 1)—0.10 g.
Polymerization conditions—30° C. for 16 hrs.

| Run No. | Titanium tetrabutoxide (component 2) (g.) | Yield (percent) | $\eta_{sp}/c$ |
|---|---|---|---|
| 1 (control) | 0 | 12.3 | 0.55 |
| 2 | 0.20 | 27.5 | 0.71 |
| 3 | 0.40 | 32.8 | 0.78 |

EXAMPLE 11

Epichlorohydrin was polymerized in the manner similar to Example 1, using the white solid prepared similarly to Example 3 (component 1) and dibutyltin dichloride (component 2) in the amount shown in Table 12 as the catalyst. The polymerization conditions, and the yield and reduced specific viscosity in the polymer produced of each run, were as shown in Table 12. For comparison, the results of the run using no dibutyltin dichloride (Run No. 1) are also given.

TABLE 12

Epichlorohydrin—25 g.
Benzene—25 g.
White solid (component 1)—0.05 g.
Polymerization conditions—30° C. for 15 hrs.

| Run No. | Dibutyltin dichloride (component 2) (g.) | Yield (percent) | $\eta_{sp.}/_c.$ |
|---|---|---|---|
| 1 (control) | 0 | 3.8 | 0.80 |
| 2 | 0.030 | 7.5 | 0.85 |
| 3 | 0.060 | 8.6 | 0.91 |

EXAMPLE 12

Epichlorohydrin was polymerized in the manner similar to Example 1, in the presence of the white solid (component 1) prepared similarly to Example 6, and ethyl ortho-silicate (component 2) in the amount specified in Table 13, as the catalyst. The polymerization conditions, and the yield and reduced specific viscosity of the polymer produced in each run, were as shown in Table 13 below. For comparison, the results of the run using no ethyl ortho-silicate are also given in the same table.

TABLE 13

Epichlorohydrin—30 g.
Benzene—20 g.
White solid (component 1)—0.060 g.
Polymerization conditions—30° C. for 20 hrs.

| Run No. | Ethyl ortho-silicate (component 2) (g.) | Yield (percent) | $\eta_{sp.}/_c.$ |
|---|---|---|---|
| 1 (control) | 0 | 7.9 | 0.89 |
| 2 | 0.030 | 9.2 | 0.95 |
| 3 | 0.090 | 10.5 | 0.92 |

EXAMPLE 13

Twenty-five (25) g. of dibutyltin dichloride and 60 g. of tributyl phosphate were mixed in a 500 ml. capacity glass vessel, and heated under stirring. The volatile matter was distilled off as formed. Violent reaction started to take place from approximately 230° C., and large quantities of volatile matter were formed. The heating was further continued until the temperature finally reached 260° C., and the reaction was continued for an additional 10 minutes at such temperature. Then the system was cooled to 150° C., and dried under reduced pressure for 2 hours. The solid product obtained (component 1) and tin tetrachloride (component 2) were used as the catalyst for polymerization of epichlorohydrin.

A 100-ml. capacity glass ampule the inside atmosphere of which had been nitrogen-substituted in advance was charged with 25 g. of epichlorohydrin, 25 g. of benzene, and tin tetrachloride (component 2) in the amount specified in Table 14, and into which 0.050 g. of the above solid reaction product (component 1) was added. The ampule was mounted on a rotatory reactor, and its content was polymerized for 20 hours at 30° C. After the reaction the product polymer was withdrawn and η-hexane insoluble component thereof was separated from the unreacted monomer and solvent. The separated polymer was vacuum-dried for 24 hours at 50° C., to provide a white solid.

The amount of tin tetrachloride used, and yield and reduced specific viscosity of the polyepichlorohydrin produced of each run, were as shown in Table 14. For comparison, the results of the runs using no tin tetrachloride (Run No. 1) and using tin tetrachloride alone (Run No. 6) are also given in the same table.

The results clearly demonstrate that the concurrent use of tin tetrachloride as a catalytic component markedly increases the polymer yield.

TABLE 14

| Run No. | Tin tetrachloride (g.) | Yield (percent) | $\eta_{sp.}/_c.$ |
|---|---|---|---|
| 1 (control) | 0 | 4.0 | 0.72 |
| 2 | 0.005 | 16.8 | 0.98 |
| 3 | 0.025 | 20.8 | 0.81 |
| 4 | 0.050 | 27.6 | 0.71 |
| 5 | 0.075 | 31.6 | 0.56 |
| 6 (control) [1] | 0.050 | 12.3 | 0.14 |

[1] Polymerization by the action of tin tetrachloride alone.

EXAMPLE 14

61 grams of tributyltin chloride and 100 g. of tributyl phosphate were mixed in a 500-ml. capacity glass vessel, and heated under stirring. The volatile matter was distilled off from the system as formed. After the temperature reached approximately 260° C., the reaction was continued for an additional 10 minutes at such temperature, and then the system was cooled to 150° C. and dried under reduced pressure for 2 hours. As a result 68 g. of a white solid were obtained. This white solid (component 1) and titanium tetrachloride (component 2) were used as the catalyst for copolymerization of epiclorohydrin and ethylene oxide.

0.11 gram of the above white solid weighed precisely was placed in a 100-ml. capacity glass ampule, and the inside atmosphere of the ampule was nitrogen-substituted. Then 51.5 g. of epichlorohydrin, 5.5 g. of ethylene oxide, and titanium tetrachloride (component 2) in the amount specified in Table 15 were added into the ampule, followed by 20 hours polymerization reaction at 30° C. After the reaction the formed polymer was withdrawn, and the n-hexane insoluble component thereof was separated from the unreacted monomer and solvent, and dried to provide a rubbery white solid. The amount in titanium tetrachloride employed, and the yield and reduced specific viscosity of the copolymer formed of each run, were as given in Table 15. For comparison, the results of the runs using no titanium tetrachloride (Run No. 1) and using titanium tetrachloride alone (Rune No. 6) are also given in the same table.

TABLE 15

| Run No. | Titanium tetrachloride (g.) | Yield (percent) | $\eta_{sp.}/_c.$ |
|---|---|---|---|
| 1 (control) | 0 | 5.5 | 1.45 |
| 2 | 0.007 | 8.3 | 1.98 |
| 3 | 0.014 | 13.4 | 2.85 |
| 4 | 0.027 | 12.1 | 2.73 |
| 5 | 0.054 | 12.9 | 2.86 |
| 6 (control) [1] | 0.054 | Trace | |

[1] Polymerization by the action of titanium tetrachloride alone.

EXAMPLE 15

Twelve (12) g. of dibutyltin oxide and 42.5 g. of tributyl phosphate were mixed in a 500-ml. capacity glass vessel, and heated under stirring. The volatile matter was distilled off from the system as formed. When the temperature reached 280° C., the reaction was continued for an additional 10 minutes at such temperature, and the system was cooled to 150° C. and dried under reduced pressure for 2 hours, to provide a white solid.

The white solid obtained (component 1) and titanium tetrachloride (component 2) were used as the catalyst for polymerization of various alkylene oxides specified in Table 16, performed in the manner similar to Example 14. After the reaction, the formed polymer was withdrawn, and freeze-dried to remove the unreacted monomer and solvent. The amounts of titanium tetrachloride and alkylene oxide employed are shown in Table 16, and the polymerization conditions, as well as the yield and reduced specific viscosity of the polymer are shown in Table 17. For comparison, the results of the runs using no titanium tetrachloride (Rune Nos. 1, 5, and 9) and using titanium tetrachloride alone (Rune Nos. 4, 8, and 11) are also given.

TABLE 16

| Run No. | Alkylene oxide Type | Weight (g.) | Benzene (g.) | White solid (component 1) (g.) | Titanium tetrachloride (component 2) (g.) |
|---|---|---|---|---|---|
| 1 (control) | Ethylene oxide | 7.1 | 37 | 0.007 | 0 |
| 2 | do | 7.1 | 37 | 0.007 | 0.007 |
| 3 | do | 7.1 | 37 | 0.007 | 0.014 |
| 4 (control)[1] | do | 7.1 | 37 | 0 | 0.014 |
| 5 (control) | Propylene oxide | 25 | 25 | 0.05 | 0 |
| 6 | do | 25 | 25 | 0.05 | 0.050 |
| 7 | do | 25 | 25 | 0.05 | 0.075 |
| 8 (control)[1] | do | 25 | 25 | 0 | 0.075 |
| 9 (control) | Allyl glycidyl ether | 15 | 35 | 0.150 | 0 |
| 10 | do | 15 | 35 | 0.150 | 0.02 |
| 11 (control) | do | 15 | 35 | 0 | 0.02 |

[1] Polymerization by the action of titanium tetrachloride alone.

TABLE 17

| Run No. | Polymerization conditions | Yield (percent) | $\eta_{sp}/c$ |
|---|---|---|---|
| 1 | 30° C., 20 hours | 1.51 | 4.09 |
| 2 | do | 9.5 | 3.75 |
| 3 | do | 21.4 | 3.69 |
| 4 | do | Trace | |
| 5 | 30° C., 19 hours | 15.5 | 4.63 |
| 6 | do | 17.9 | 5.12 |
| 7 | do | 20.8 | 5.53 |
| 8 | do | Trace | |
| 9 | 30° C., 20 hours | 21.5 | 0.08 |
| 10 | do | 29.6 | 0.09 |
| 11 | do | Trace | |

EXAMPLE 16

Twenty (20) ml. of carbon tetrachloride, 13.3 g. of tributyltin chloride, 12.6 g. of phosphorus oxychloride and 30.4 g. of n-butanol were mixed in a 100-ml. capacity glass vessel, and heated to remove the solvent, unreacted monomers, and volatile matter by distillation. When the temperature reached approximately 290° C., the reaction at such temperature was continued for an additional 5 minutes, and the system was cooled to 150° C. and dried under reduced pressure for 2 hours, to provide 19.8 g. of a white solid.

The white solid obtained (component 1) and the metal halide (component 2) specified in Table 18 were used as the catalyst for copolymerization of epichlorohydrin and ethylene oxide performed in the manner similar to Example 15. The polymerization conditions, and the yield and reduced specific viscosity of the copolymer formed of each run, were as shown in Table 18. For comparison, the results of the runs using no metal halide (Run No. 1) and using metal halide alone (Run Nos. 4, 7, and 9) are also shown in the same table.

TABLE 18

Epichlorohydrin—51.5 g.
Ethylene oxide—5.5 g.
White solid (component 1)—0.11 g.
Polymerization conditions—10° C. for 20 hrs.

| Run No. | Metal halide (component 2) Type | Amount (g.) | Yield (percent) | $\eta_{sp}/c$ |
|---|---|---|---|---|
| 1 (control) | | 0 | 4.8 | 2.33 |
| 2 | Titanium tetrachloride | 0.027 | 10.5 | 3.87 |
| 3 | do | 0.054 | 9.6 | 2.85 |
| 4 (control)[1] | do | 0.054 | Trace | |
| 5 | Tin tetrachloride | 0.027 | 11.2 | 1.72 |
| 6 | do | 0.054 | 10.9 | 1.58 |
| 7 (control)[1] | do | 0.054 | 2.3 | 0.12 |
| 8 | Zirconium tetrachloride | 0.027 | 7.8 | 2.34 |
| 9 (control)[1] | do | 0.027 | 3.3 | 0.28 |

[1] Polymerization by the action of metal halide alone.

EXAMPLE 17

In a 100 ml. capacity glass vessel charged with 20 g. of carbon tetrachloride, 7.6 g. of zirconium tetrachloride, 5 g. of phosphorus oxychloride, and 24 g. of n-butanol were reacted, and the system was heated to remove the volatile matter by distillation. When the temperature reached 210° C., the system was cooled to provide 24 g. of a brown solid. This brown solid (component 1) and tin tetrachloride (component 2) in the amount specified in Tables 19 and 20 were used as the catalyst for polymerization of ethylene oxide and propylene oxide, performed in the manner similar to Example 16. After the reaction the formed polymer was withdrawn and freeze-dried to provide white solid. The amount of tin tetrachloride used, polymerization conditions, as well as the yield and reduced specific viscosity of the polymer formed, are shown in Tables 19 and 20. Also the results of control runs using no tin tetrachloride (Run Nos. 1 and 5) and using tin tetrachloride alone (Run Nos. 4 and 8) are given in the same tables.

TABLE 19

Ethylene oxide—7.1 g.
Benzene—37 g.
Brown solid (component 1)—0.007 g.
Polymerization conditions—30° C. for 20 hrs.

| Run No. | Tin tetrachloride (component 2) (g.) | Yield (percent) | $\eta_{sp}/c$ |
|---|---|---|---|
| 1 (control) | 0 | 1.51 | 4.09 |
| 2 | 0.007 | 13.5 | 4.21 |
| 3 | 0.014 | 31.7 | 4.53 |
| 4 (control)[1] | 0.014 | 7.7 | 2.53 |

[1] Polymerization by the action of tin tetrachloride alone.

TABLE 20

Propylene oxide—25 g.
Benzene—25 g.
Brown solid (component 1)—0.05 g.
Polymerization conditions—30° C. for 19 hrs.

| Run No. | Tin tetrachloride (component 2) (g.) | Yield (percent) | $\eta_{sp}/c$ |
|---|---|---|---|
| 5 (control) | 0 | 1.55 | 4.63 |
| 6 | 0.05 | 25.2 | 5.16 |
| 7 | 0.075 | 34.0 | 5.35 |
| 8 (control)[1] | 0.075 | 3.9 | 0.53 |

[1] Polymerization by the action of tin tetrachloride alone.

What is claimed is:

1. In a process for the preparation of homopolymers of copolymers of alkylene oxides by polymerizing at least one alkylene oxide in the presence of a catalyst, the improvement wherein said catalyst comprises a composition formed by mixing (1) the reaction product obtained by reacting at least one compound selected from the group consisting of organotin compound containing at least one SN-C linkage in its molecule selected from:

(i) tetra-alkyl tin,
(ii) tetra-aryl tin,
(iii) alkyl-triaryl tin, (iv) trialkyl-aryl tin,
(v) alkyl tin halides,
(vi) aryl tin halides,
(vii) alkyl tin oxides,
(viii) alkyl tin hydroxides,
(ix) aryl tin hydroxides,
(x) alkyl tin sulfides,
(xi) dialkoxy-dialkyl tin,
(xii) alkyl tin carboxylates,
(xiii) arylstannic acids,
(xiv) alkyl tin hydrides,
(xv) bis-diphenyl tin pyrophosphate, and
(xvi) dialkyl tin disodium, and a chloride of titanium, zirconium, hafnium, or tin, with a phosphoric acid ester having an organic radical containing 1–12 carbon atoms selected from:

(a) trialkyl phosphates, and
(b) a mixture of a phosphorus oxyhalide and an alcohol;

with (2) a compound selected from the group consisting of a dialkyl zinc, dialkyl magnesium, trialkyl aluminum, alkyl aluminum hydrides, alkyl aluminum halides, alkyl tin halides, alkoxides of aluminum, titanium or silicon and chlorides of titanium, zirconium or tin.

References Cited

UNITED STATES PATENTS

| | | | |
|---|---|---|---|
| 3,244,646 | 4/1966 | Naro et al. | 260—2 |
| 3,312,637 | 4/1967 | Durst et al. | 260—2 |

FOREIGN PATENTS 945,151  12/1963  Great Britain _____ 260—2 A

HAROLD D. ANDERSON, Primary Examiner

E. A. NIELSEN, Assistant Examiner

U.S. Cl. X.R.

252—431 R; 260—615 B